(12) United States Patent
Matsuura et al.

(10) Patent No.: US 6,442,927 B1
(45) Date of Patent: Sep. 3, 2002

(54) GAS TURBINE FOR COMBINED CYCLE POWER PLANT

(75) Inventors: Masaaki Matsuura; Kiyoshi Suenaga; Kazuo Uematsu, all of Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/381,974

(22) PCT Filed: Feb. 3, 1998

(86) PCT No.: PCT/JP98/00434
§ 371 (c)(1),
(2), (4) Date: Oct. 4, 1999

(87) PCT Pub. No.: WO99/40305
PCT Pub. Date: Aug. 12, 1999

(51) Int. Cl.⁷ ............................. F02C 6/18; F02C 7/18
(52) U.S. Cl. ...................... 60/39.182; 60/806
(58) Field of Search ............ 60/39.182, 39.75, 60/806; 415/115

(56) References Cited

U.S. PATENT DOCUMENTS

| | | | |
|---|---|---|---|
| 3,756,020 A | * 9/1973 | Moskowitz et al. | ........... 60/760 |
| 4,117,669 A | * 10/1978 | Heller | ......................... 415/115 |
| 4,424,668 A | * 1/1984 | Mukherjee | ............... 60/39.182 |
| 4,571,935 A | * 2/1986 | Rice | ............................ 60/39.05 |
| 5,557,922 A | * 9/1996 | Hoshino et al. | ........... 60/39.75 |
| 5,593,274 A | * 1/1997 | Carreno et al. | .............. 415/115 |
| 5,605,437 A | * 2/1997 | Meylan | ........................ 415/175 |
| 6,065,282 A | * 5/2000 | Fukue et al. | .............. 60/39.182 |
| 6,105,362 A | * 8/2000 | Ohtomo et al. | .......... 60/39.182 |

FOREIGN PATENT DOCUMENTS

| | | |
|---|---|---|
| EP | 0 735 243 | 10/1996 |
| EP | 0 806 544 | 11/1997 |
| FR | 2 174 497 | 10/1973 |
| GB | 2 236 145 | 3/1991 |
| JP | A-63-40244 | 2/1988 |
| JP | 3-96628 | 4/1991 |
| JP | 8-284687 | 10/1996 |
| JP | 9-4411 | 1/1997 |
| JP | 9-189236 | 7/1997 |
| JP | 8-284684 | 10/1997 |
| JP | 10-061457 | 3/1998 |

* cited by examiner

Primary Examiner—Ted Kim
(74) Attorney, Agent, or Firm—Oblon, Spivak, McClelland, Maier & Neustadt, P.C.

(57) ABSTRACT

A combined cycle power plant has a gas turbine and an exhaust heat recovery boiler to which exhaust gas from the gas turbine is supplied. The exhaust heat recovery boiler is configured to generate steam for cooling. The combined cycle power plant has several elements: a cooling steam supply pipe; a cooling steam recovery pipe; and a cooling steam connecting pipe. The cooling steam connecting pipe has a cross-sectional area larger than cross-sectional areas of the cooling steam supply pipe and the cooling steam recovery pipe so that a pressure drop thereacross, as a whole, is small.

3 Claims, 3 Drawing Sheets

GAS TURBINE FOR COMBINED CYCLE POWER PLANT

CROSS REFERENCE TO RELATED APPLICATIONS

This application is filed pursuant to 35 USC §371 and is based upon PCT Application Ser. No. PCT/JP98/00434 filed on Feb. 3, 1998 and Japanese Patent Application Serial No. 08-225412 filed on Aug. 27, 1996.

FIELD OF THE INVENTION

The present invention relates to a gas turbine, especially, for a combined cycle power plant.

DESCRIPTION OF THE BACKGROUND

In a gas turbine, a steam cooling system in which blades are cooled by steam in proportion as an inlet temperature of high temperature combustion gas increases, has been proposed. Especially, in a combined cycle power plant comprising an exhaust heat recovery boiler in which exhaust gas from the gas turbine is used as a heat source, the following steps have been proposed to improve the thermal efficiency of the gas turbine and the combined efficiency of the plant: generating low temperature steam for cooling, using the low temperature steam in the gas turbine for cooling a turbine blade, using the heated cooling steam in a steam turbine, and recovering the thermal energy. An example of such a conventional steam cooling structure of a gas turbine blade is shown in FIG. 3.

Cooling paths 5 and 7 are formed inside of a first stage stationary blade 1 and a second stage stationary blade 3, respectively, which are respectively connected to heads 9 and 11, and those heads 9 and 11 are connected to independent cooling steam supply pipes 13 and 15, and cooling steam recovery pipes 17 and 19. Those cooling steam supply pipes 13 and 15 are connected to an exhaust heat recovery boiler (not shown in FIG. 3) and the cooling steam recovery pipes 17 and 19 are connected to the low pressure turbine of the steam turbine via a separate superheater.

Furthermore, it has been proposed that the cooling steam flow in series with the cooling paths formed in each stage's turbine blades (Japanese Patent Application, Second Publication, No. Sho 63-40244).

As aforementioned, in a steam cooling system in which the cooling steam flows in parallel to each stage's stationary blades of the gas turbine in the steam turbine of the plant and is recovered, and also flows into the steam turbine, the above mentioned separate superheater is required in order to regulate the condition of the cooling steam, therefore, the power plant is complicated in structure, large, and its total cost is high.

Furthermore, when cooling steam flows in series to each stage's stationary blades of the gas turbine in the steam turbine, the whole structure of the power plant is complicated, and the pressure drops due to the flow becoming large, so that heat recovery efficiency in the steam turbine tends to decrease.

SUMMARY OF THE INVENTION

In view of the aforementioned, an object of the present invention to provide a gas turbine for a combined cycle power plant wherein the cooling steam used for heat recovery has a small pressure drop and a special apparatus such as a superheater or the like for a steam turbine is not required.

To achieve the above object, the present invention provides a gas turbine for a combined cycle power plant comprising a steam cooled system having a gas turbine for generating steam for cooling in an exhaust heat recovery boiler to which exhaust gas from the gas turbine is supplied, and cooling the stationary blades with the steam for cooling; wherein the steam cooled system is constituted by connecting a cooling steam supply pipe from the exhaust heat recovery boiler to a cooling path formed in a first stage stationary blade, connecting a cooling steam recovery pipe connecting a steam turbine to a cooling path formed in a second stage stationary blade, and forming a cooling steam connecting path which has a relatively large cross-sectional area, to connect the cooling paths formed in the above first stage and second stage stationary blades.

The gas turbine for the combined cycle power plant of the present invention generates the steam for cooling in the exhaust heat recovery boiler to which the exhaust gas from the gas turbine is supplied and cools the stationary blades with the steam for cooling, wherein the cooling steam recovery pipe from the aforesaid exhaust heat recovery boiler is connected to the cooling path formed in the first stage stationary blade, the cooling steam recovery pipe connecting the steam turbine to the cooling path formed in the second stage stationary blade, and a cooling steam connecting path, which has a relatively large cross-sectional area, is formed to connect cooling paths formed in the above first stage and second stage stationary blades, so that the steam for cooling, which has flowed in the cooling paths in the first stage and second stage stationary blades, can be continuously used in the steam turbine as steam for cooling because the above steam for cooling has a suitable temperature to drive a medium-pressure turbine of the steam turbine and also the cooling steam connecting path has a relatively large cross-sectional area, and the pressure drop is as a whole small. Therefore, since no special apparatus such as a heating apparatus is required, and the steam for cooling is recovered and used, an increase in manufacturing cost can be avoided and also the efficiency of the combined cycle power plant can be improved.

DETAILED DESCRIPTION OF THE INVENTION

Figure 1:
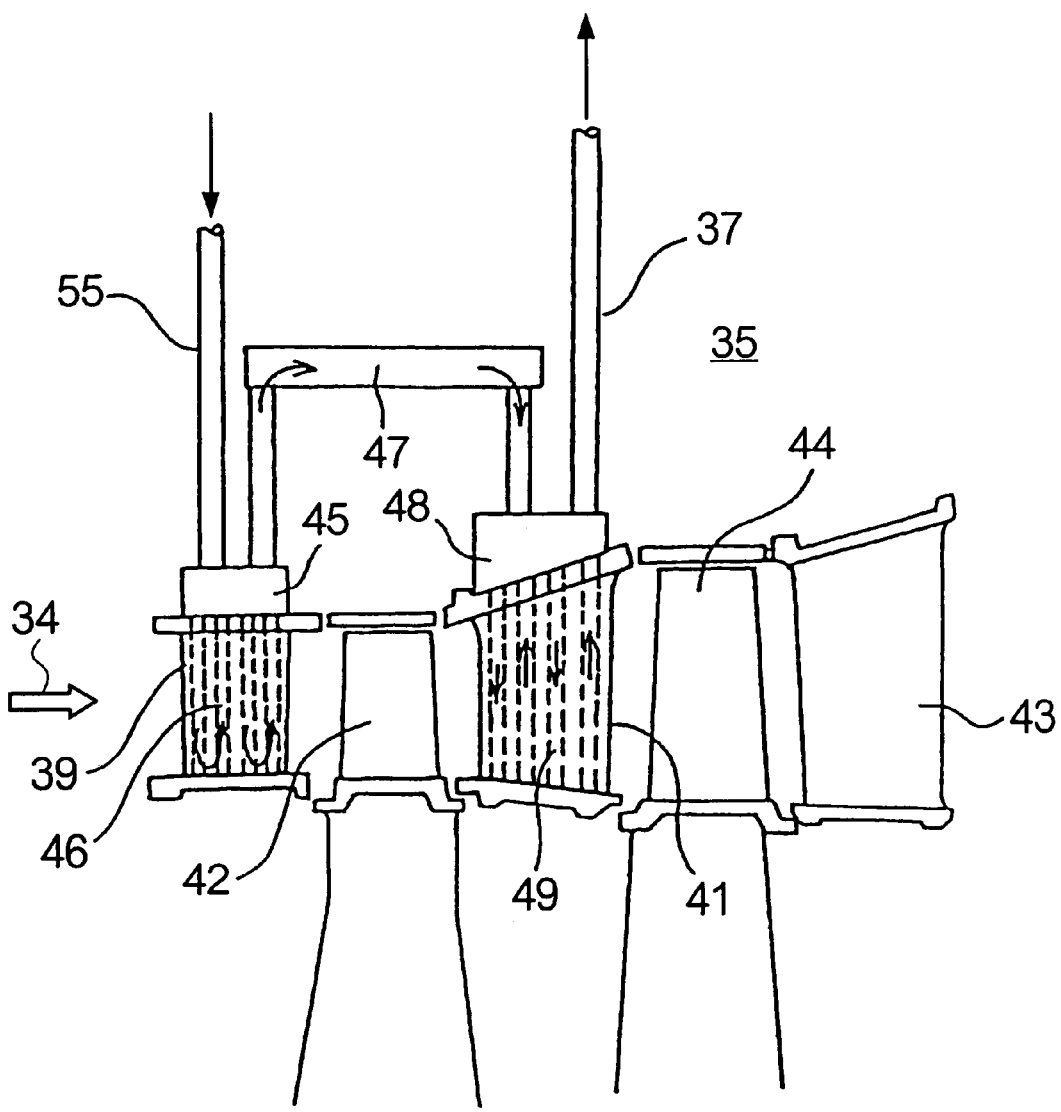
FIG. 1 is a conceptual system diagram showing the prominent features of one embodiment according to the present invention.

The embodiment of the present invention is explained by referring to the drawings as follows.

Figure 2:
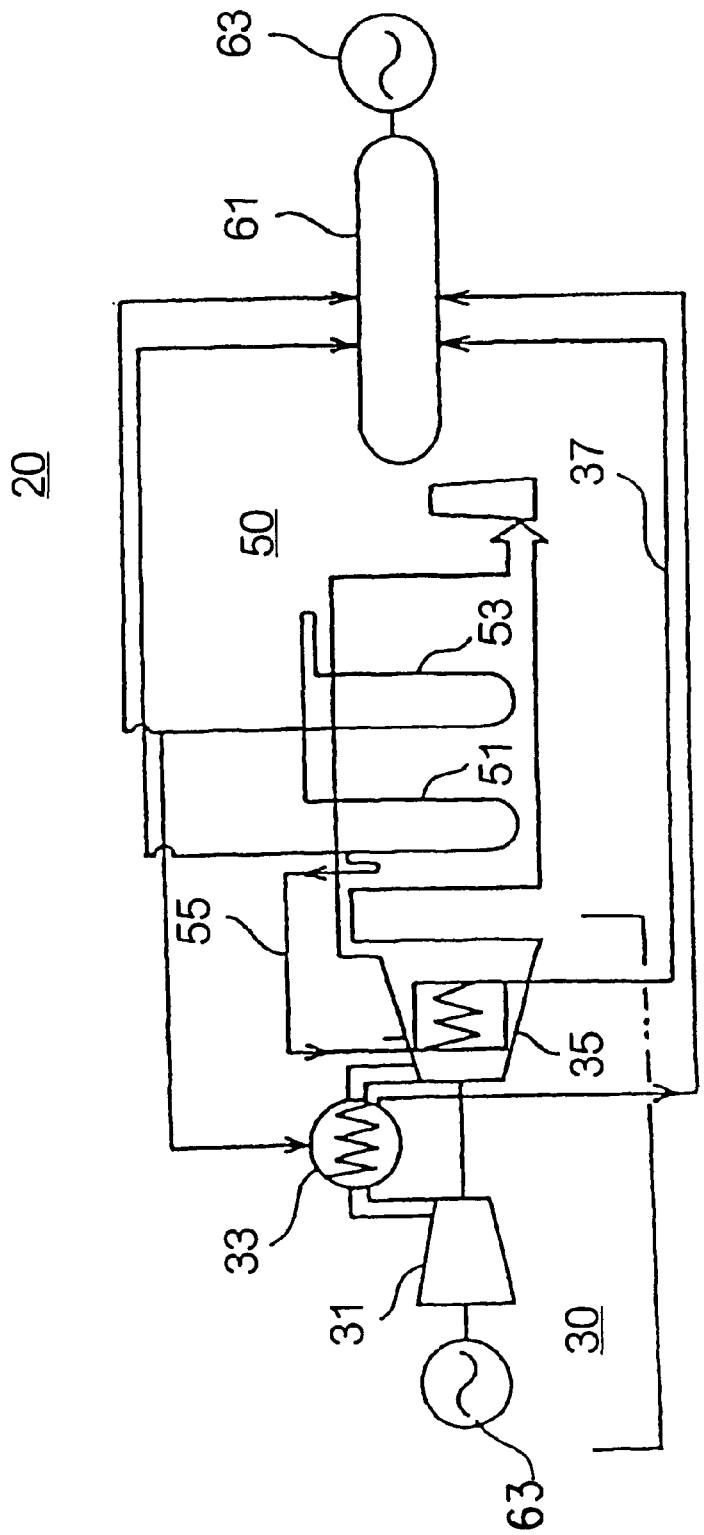
FIG. 2 is a system diagram of the combined cycle power plant of the embodiment according to the present invention.
Figure 3:
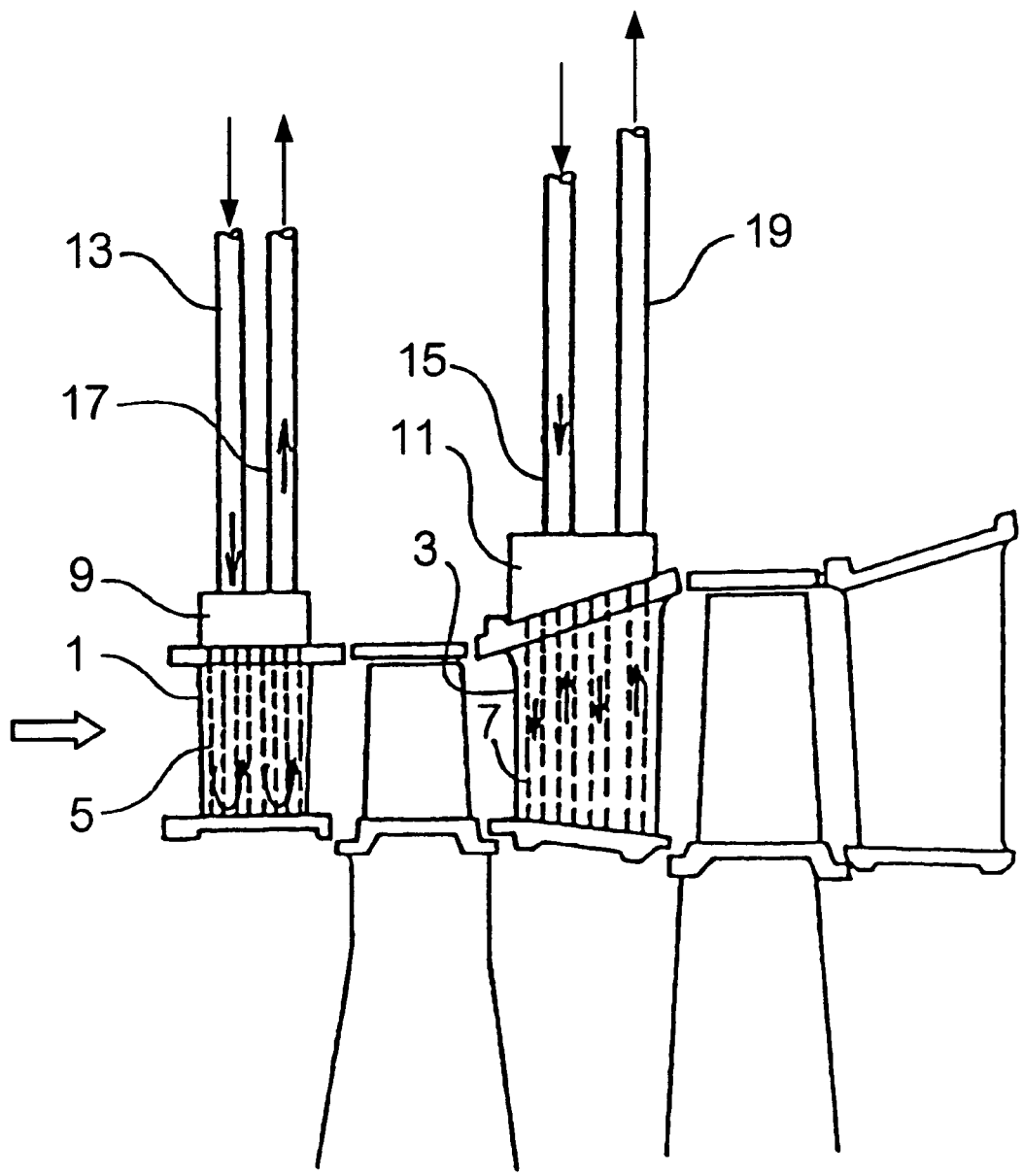
FIG. 3 is a conceptual system diagram showing an embodiment of a steam cooling system in a conventional gas turbine blade.

A system of a combined cycle power plant 20 is explained by referring to FIG. 2. A gas turbine 30 comprises a compressor 31, a combustor 33, and a turbine part 35, wherein the compressor 31 compresses air, the compressed air is burned by blowing fuel in the combustor 33, a rotor is driven by supplying a high temperature combustion gas to the turbine part 35, and finally, electrical energy is extracted by driving a first generator 63. Exhaust gas in the gas turbine 30 is supplied to an exhaust heat recovery boiler 50, high-pressure steam and medium-pressure steam are respectively generated in a high-pressure evaporator 51 and a medium-pressure evaporator 53, and those two types of steam are supplied to, for example, a two-stage steam turbine 61 to drive it, and finally, electrical energy is extracted by driving a second generator 63. Then, a part of the medium-pressure steam is used for cooling the combustor 33 and a part of the high-pressure steam is supplied as steam for cooling the turbine part 35 of the gas turbine 30 via the cooling steam supply pipe 55. Furthermore, the steam for cooling is supplied to the steam turbine 61 via a cooling steam recovery pipe 37 and is used for driving the turbine 61.

In FIG. 1, the structure of the steam cooling system of the turbine part 35 is conceptually shown. In FIG. 1, a first stage stationary blade 39, a second stage stationary blade 41, and a third stage stationary blade 43 are provided as stationary blades and their blade parts are set in the circumference of the turbine part 35. Moreover, a first stage moving blade 42 behind the first stage stationary blade 39 and a second stage moving blade 44 behind the second stage stationary blade 41 are provided as moving blades, and the high temperature combustion gas, as shown by arrow 34, flows through each stage of blade rows and rotates the moving blades 42 and 44. The cooling steam supply pipe 55 is connected to a junction 45 of the first stage stationary blade 39, and its steam flowing path is connected to a cooling path 46 in the first stage stationary blade 39. The junction 45 of the first stage stationary blade 39 is connected to a junction 48 of the second stage stationary blade 41 via a connecting pipe 47, its steam path is connected to a cooling path 49 in the second stage stationary blade 41, and finally, the steam path is connected to the cooling steam recovery pipe 37. Further, the cross-sectional area of the cooling steam connecting path of the connecting pipe 47 is set to be larger than the other parts i.e. the recovery pipe 37 and the supply pipe 55.

In the turbine part 35 comprising the constituents mentioned above, the first stage stationary blade 39, the second stage stationary blade 41, the third stage stationary blade 43, etc., tend to undergo increases in temperature because of the high temperature combustion gas which flows into the blades, contacts and heats the blades. A part of the high temperature steam generated in FIG. 2 in the high-pressure evaporator 51 in the exhaust heat recovery boiler 50 works as steam for cooling and flows into the turbine part 35 through the cooling steam supply pipe 55. The steam maintains its temperature, for example, 350° C., in FIG. 1 at a part of the junction 45 (the inlet of the first stage stationary blade 39), and cools the inside of the first stage stationary blade 39 by flowing through the cooling path 46. The metal in the first stage stationary blade 39 is maintained at, for example, 850° C. or less by the above cooling. The steam out flowing through the connecting pipe 47 is maintained at approximately 450° C. and cools the inside of the second stage stationary blade 41 by flowing in the cooling path 49 via the path in the branched assembly of the junction 48. As mentioned above, in regard to FIG. 2, the steam for cooling is heated to, for example, approximately 560° C., and sent to the steam turbine 61 through the cooling steam recovery pipe 37, and is used as steam for driving the turbine 61.

What is claimed is:

1. A combined cycle power plant having a gas turbine and an exhaust heat recovery boiler to which exhaust gas from the gas turbine is supplied, said exhaust heat recovery boiler configured to generate steam for cooling, said combined cycle power plant comprising:

a cooling steam supply pipe configured to supply cooling steam from the exhaust heat recovery boiler to a turbine part including a first stage stationary blade cooled by the steam for cooling, said first stage stationary blade having a first cooling path formed therein and connected to the cooling steam supply pipe;

a cooling steam recovery pipe configured to communicate with a steam turbine and connected to a second cooling path formed in a second stage stationary blade in the turbine part; and a cooling steam connecting pipe formed to connect the first cooling path in the first stage stationary blade with the second cooling path in the second stage stationary blade;

wherein said cooling steam connecting pipe has a cross-sectional area larger than a cross-sectional area of each of the cooling steam supply pipe, the cooling steam recovery pipe, a first pipe exiting the first stage stationary blade, and a second pipe entering the second stage stationary blade; and wherein said cooling steam supply, connecting, recovery, first and second pipes are all positioned exterior to a high temperature combustion gas flow path of the gas turbine.

2. A combined cycle power plant having a gas turbine and an exhaust heat recovery boiler to which exhaust gas from the gas turbine is supplied, said exhaust heat recovery boiler configured to generate steam for cooling, said combined cycle power plant comprising:

a cooling steam supply pipe configured to supply cooling steam from the exhaust heat recovery boiler to a turbine part including a first stage stationary blade cooled by the steam for cooling, said first stage stationary blade having a first cooling path formed therein and connected to the cooling steam supply pipe;

a cooling steam recovery pipe configured to communicate with a steam turbine and connected to a second cooling path formed in a second stage stationary blade in the turbine part; and a cooling steam connecting pipe formed to connect the first cooling path in the first stage stationary blade with the second cooling path in the second stage stationary blade;

wherein said cooling steam connecting pipe has a cross-sectional area larger than a cross-sectional area of each of the cooling steam recovery pipe and a pipe entering the second stage stationary blade; and wherein said cooling steam supply pipe, connecting pipe, recovery pipe, and the pipe entering the second stage stationary blade are all positioned exterior to a high temperature combustion gas flow path of the gas turbine.

3. A combined cycle power plant having a gas turbine and an exhaust heat recovery boiler to which exhaust gas from the gas turbine is supplied, said exhaust heat recovery boiler configured to generate steam for cooling, said combined cycle power plant comprising:

a cooling steam supply pipe configured to supply cooling steam from the exhaust heat recovery boiler to a turbine part including a first stage stationary blade cooled by the steam for cooling, said first stage stationary blade having a first cooling path formed therein and connected to the cooling steam supply pipe;

a cooling steam recovery pipe configured to communicate with a steam turbine and connected to a second cooling path formed in a second stage stationary blade in the turbine part; and a cooling steam connecting pipe formed to connect the first cooling path in the first stage stationary blade with the second cooling path in the second stage stationary blade;

wherein said cooling steam connecting pipe has a cross-sectional area larger than a cross-sectional area of each of the cooling steam supply pipe and a pipe exiting the first stage stationary blade; and wherein said cooling steam supply pipe, connecting pipe, recovery pipe, and the pipe exiting the first stage stationary blade are all positioned exterior to a high temperature combustion gas flow path of the gas turbine.

* * * * *

UNITED STATES PATENT AND TRADEMARK OFFICE
CERTIFICATE OF CORRECTION

PATENT NO. : 6,442,927 B1
DATED : September 3, 2002
INVENTOR(S) : Matsuura et al.

It is certified that error appears in the above-identified patent and that said Letters Patent is hereby corrected as shown below:

<u>Title page, Item [54] and Column 1, lines 1 and 2,</u>
Should read:

-- GAS TURBINE FOR COMBINED CYCLE POWER PLANT WITH STEAM COOLING OF STATIONARY BLADES --

Signed and Sealed this

Seventh Day of January, 2003

JAMES E. ROGAN
*Director of the United States Patent and Trademark Office*